United States Patent Office 2,759,843
Patented Aug. 21, 1956

2,759,843

ASPHALT CONTAINING AN AEROGEL

Harley F. Hardman, Lyndhurst, Everett C. Hughes, Shaker Heights, and Franklin Veatch, Cleveland, Ohio, assignors to The Standard Oil Company, Cleveland, Ohio, a corporation of Ohio No Drawing. Application January 23, 1953,
Serial No. 333,002

5 Claims. (Cl. 106—281)

The present invention relates to an asphalt composition and a method of making the same. More particularly it relates to a composition comprising petroleum asphalt and an aerogel; and to a method of making such a composition.

With the development of the extensive use of asphalt cements in bituminous pavements, asphalts have been extensively investigated and a number of specifications have developed over the years. As more and more information has accumulated, additional specifications have been added from time to time to the growing list. Among the numerous specifications which are frequently required of asphaltic material for various purposes are no-foaming tendencies at elevated temperatures, prescribed values of specific gravity, flash point, percent loss at elevated temperature, penetration of residue, total bitumen content, percent ash content, negative oliensis spot test, softening point, ductility at 77° F., temperature susceptibility and penetration at 77° F.

The softening point is a standardized test for identifying different grades of asphaltic material. It is especially useful in ascertaining the adaptability of a bituminous material for many certain definite usages, such as its resistance to the sun or artificial heat. The most usual test is the standardized ring-and-ball method defined in American Society for Testing Materials (ASTM) Standards 1942, II, 488.

Penetration is defined as the consistency of a bituminous material, that is, the resistivity to deformation, and is expressed as the distance that a standard needle vertically penetrates a sample of the material under known conditions of loading, time and temperature.

Temperature susceptibility is a comparison of a consistency or hardness of the asphalt at elevated temperatures with its consistency at lower temperatures. Numerically, it is the ratio of the penetration value of the asphalt at a higher temperature to the penetration of the asphalt at a lower temperature. Several different higher temperatures and several different lower temperatures have been proposed as the best for comparison purposes. For purposes of the present disclosure, the two values are taken at 77° F. and 32° F., respectively. The temperature susceptibility is therefore defined therein as the ratio of penetration at 77° F. divided by the penetration at 32° F.

Another measurement of temperature susceptibility is the softening point-penetration index. This index is equal to:

$$\frac{\log 800 - \log 77° \text{ Pen.}}{\text{R. and B. soft. pt.} - 77}$$

and the lower the value of this index, the better the temperature susceptibility of the asphalt.

Resistance to flow is another property of asphalt which is very desirable in many cases. At the present time there is no standardized procedure for measuring this property but it can be observed conveniently by noting the amount of deformation that occurs in a ball of asphalt that has been placed upon a flat surface. Asphalts having a high resistance to flow are especially adaptable for such uses as joint fillers and undercoatings where it is required that the asphalt be easily pumpable but yet remain in place after application.

Asphalts are considered to be colloidal systems in which asphaltenes constitute the dispersed phase and petrolenes the dispersing phase. The term "asphaltene" as used herein refers to that portion of an asphalt which is soluble in carbon disulfide and insoluble in 50 volumes of normal pentane per volume of asphalt.

Petroleum asphalt may be defined as the residual fraction of crude oil whose lighter fractions have been removed by distillation. The asphalt possesses certain empirical characteristics, which in turn are determined by the intended use of the asphalt. The production of asphalt from crude oil is almost universally controlled by allowing the distillation process to continue until the consistency of the asphalt reaches a predetermined value which is specified for the particular use to which the asphalt is to be applied. As already pointed out, this consistency is defined as the penetration of the residue.

The desired penetration value for the final product may be obtained by either a straight distillation to the desired consistency, or by the combination of distillation to a certain consistency followed by oxidation of the product to the finally desired consistency or penetration. Thus a penetration value of 70–80, for example, may be obtained either by distilling a crude oil completely to a penetration of 70–80 or by distilling crude oil to some intermediate penetration, such as 200–300 and then oxidizing this residue until the penetration value is decreased to the desired 70 or 80. During the oxidation, additional amounts of asphaltenes are produced.

The oxidation of the reduced crude which is a commonly employed mode of operation, is usually effected by blowing air through the residue at a temperature of about 400–500° F. at a rate of about 30–50 cubic feet per minute per ton of asphalt charge until the desired penetration is obtained.

In the past, many different materials have been used as fillers or thickeners for asphalt. Such materials include clays of various types, alumina, talc, powdered asbestos and the like. It has also been proposed to add a silica aerogel to lubricating oil for the purpose of thickening the oil.

In U. S. Patent No. 1,620,900 there is described a composition comprising a major proportion of asphalt and a minor proportion of an emulsifying agent such as bentonite. The specification of this patent states that "it is evident that the peculiar property developed by this composition is a result of its having undergone emulsification" and that "the same bituminous emulsion which will produce a non-fusible end product in the absence of agitation (after removal of water) will, if agitated or disturbed, produce a fusible end product, indicating the effect of agitation in breaking up the gel structure produced by the emulsifying agent." It is evident from this disclosure that the desirable properties of the product are achieved by the emulsification of the asphalt with an aqueous mixture of the bentonite or other substances with subsequent removal of the water. The composition of this invention has several advantages over the composition of this patent, a primary advantage being that the composition of this invention does not permanently lose its desirable properties upon agitation.

In accordance with this invention it has been found that a minor proportion of an aerogel may be added to a petroleum asphalt to produce an asphalt composition having greatly improved resistance to flow coupled with good temperature susceptibility characteristics. The action of the aerogel is more than a mere thickening action as is evidenced by the fact that the aerogel imparts unique properties to the asphalt that are not imparted by the known thickening agents.

In a particular embodiment of this invention, the addition of the aerogel is employed as a substitute for at least a part of the oxidation of the pipe still bottoms from which asphalt is commonly made. Thus the addition of an aerogel compensates for the increased amount of asphaltenes that it would have been necessary to produce by oxidation to obtain an asphalt of the same final penetration value. For example, in the manufacture of petroleum asphalt, pipe still bottoms are commonly oxidized to a penetration in the range of 70 to 100 at 77° F., but when an aerogel is to be added, the pipe still bottoms may be oxidized to a penetration in excess of 100 at 77° F. and further decrease in penetration can be effected by addition of an aerogel. The asphalt compositions produced by the addition of an aerogel have good temperature susceptibility characteristics similar to an asphalt produced by oxidizing to the same penetration value, but the compositions possess a higher softening point and greater resistance to flow. These properties are of special importance in many applications of asphalt.

The invention is not, however, limited to the embodiment described hereinabove. The aerogel may be blended with petroleum asphalt of any characteristics, however produced, to impart the improved properties described herein. Thus, instead of substituting for the final stages of oxidation in producing blown asphalt, the addition of aerogel may also be substituted for the final stages of distillation in producing distilled asphalt without oxidation.

Among the aerogels which may be employed are those formed from any material not incompatible with asphalt, such as silica, alumina, and other gel-forming metal oxides.

A series of silica gels which can be used in the composition of the invention are manufactured by The Monsanto Chemical Company and marketed under the trade name "Santocel."

Santocel C is prepared from a sodium silicate solution in the following manner:

The solution is neutralized with sulfuric acid and allowed to stand until the mixture sets to form a hydrogel. The by-product sodium sulfate is washed out by repeated washings with water. The continuous water phase in this hydrogel is then replaced by continued washing with alcohol until an alcogel is formed. In order to remove the liquid phase without collapse of the gel structure, the alcogel is placed in an autoclave. It is then heated above the critical temperature of the alcohol and the pressure is increased until it exceeds the critical pressure of the alcohol. The vent valve is then opened and the alcohol is permitted to escape. Under these conditions the silica gel structure remains practically undisturbed and the liquid phase of the gel is replaced with air. The material is then reduced in particle size by blowing it through a series of pipes, containing sharp bends, with jets of compressed air. Santocel C has a secondary particle size of about 3–5 microns.

Santocel A is prepared similarly to Santocel C up to the point of removal of the product from the autoclave. This material is run through a continuous heating chamber where it is heated for ½ hour to a temperature of about 1500° F. to eliminate the last traces of volatile material. It is then broken down in a reductionizer or micronized to a particle size of about 1/16 inch in diameter. The solids content of the original hydrogel used in preparing Santocel C is approximately 25% higher than that of Santocel A.

Santocel AR is a modification of A, differing in that the material is reductionized to about the same particle size as Santocel C, approximately 3 to 5 microns in diameter.

Santocel ARD is a modification of AR, differing in that ARD is densified by extracting air under vacuum and therefore has a smaller volume than AR.

Santocel AX is an A, which has not been devolatilized.

Santocel CDv is a C which has been devolatilized in the same manner as Santocel A. The Santocel is reductionized before being devolatilized.

Santocel CDvR differs slightly from CDv in that the CDvR has been devolatilized just after heating in the autoclave and then reductionized. It differs from CDv in that the latter is reductionized before being devolatilized.

The primary differences between the A and C are as follows:

1. The C's are prepared from a sodium silicate solution containing 25% more silica than the A's. Therefore, in general, the A's are lighter and composed of smaller particles than the C's.
2. The A's have undergone a devolatilization step in their preparation.

The following are the bulk densities of several of the preferred silica aerogels:

| | Density, grams/ml. |
|---|---|
| AR | 0.029 |
| ARD | 0.056 to 0.064 |
| C | 0.082 |

In general, AR and ARD show superior gelling ability and the A's in general are better than the C's.

Silica aerogels which have been devolatilized generally have a higher gelling efficiency than the undevolatilized aerogels.

The asphaltic composition may contain from about 1 to 20% by weight of a silica aerogel, preferably 5 to 10% by weight. Amounts greater than 20% cause the resulting composition to be too thick for ready application. Solvents, such as lighter oils, may be used in the composition without impairing its temperature susceptibility properties. Likewise other additive such as clays, talc, alumina and the like may be present if desired.

The temperature of addition of the aerogel to the asphaltic composition is not critical and it is necessary only to have the asphalt heated to a temperature such that it is fluid, in order to obtain complete dispersion of the aerogel.

The invention will be further illustrated by reference to the following specific examples:

EXAMPLE 1

The results of a number of tests on a series of samples are summarized in Table I below. The asphalt samples were prepared by heating pipe still bottoms to 300° F., stirring in the indicated quantity of Santocel C and finally mixing vigorously until the material is completely free from lumps or any indication of poor dispersion.

*Table I*

PROPERTIES OF ASPHALTS MADE BY ADDING SANTOCEL C TO PIPE STILL BOTTOMS (PEN. 77°=200)

| | Sample No. | | |
|---|---|---|---|
| | 1 | 2 | 3 |
| Wt. Percent Santocel C | 13.0 | 10.0 | 5.0 |
| Wt. Percent Pipe Still Bottoms | 87.0 | 90.0 | 95.0 |
| Pen. at 77° F | 91 | 121 | 163 |
| Pen. at 100° F | 214 | 205 | 300 |
| Pen. at 32° F | 27 | 32 | 38 |
| R. & B. Soft. Pt., degrees | 144 | 119 | 105 |
| Ductility: | | | |
| 77°—5 cm./min | 13 | 29 | 52 |
| 60°—5 cm./min | 16 | 34 | 66 |
| Pen. 77°/pen. 32° | 3.5 | 4.0 | 5.4 |
| Soft. Pt.-Pen. Index × $10^2$ | 1.41 | 1.95 | 2.47 |

The low figure of softening point-penetration index obtained for Example 1, containing 13% Santocel C, indicates that it has an improved temperature susceptibility over the other two examples. It was observed that the asphalt of Sample 1 did not flow under its own weight, this being determined by placing a ball of asphalt on a flat surface and observing the amount of deformation; and also by noting that the surface of a beaker of asphalt from which a sample had been taken failed to level out during several days.

Samples 2 and 3 containing 10 and 5% Santocel C, respectively, when placed on a flat surface, do flow at room temperature, but more slowly than is normal for asphalts of the same penetration. The asphalt containing 10% Santocel C flowed more slowly than that containing 5%.

The resistance to flow possessed by these asphalt compositions is believed to be unique and it can be used to advantage in the preparation of brick and crack fillers which are required to have a softening point in excess of 185° F., as penetration in excess of 30 and must be capable of considerable elongation at 0° F. By the addition of an aerogel, a relatively high softening point can be attained while producing an otherwise soft asphalt.

It was found necessary to add considerably more Santocel C to reach a given penetration than the amount of asphaltenes which it would have been necessary to produce by oxidation. For example, Sample 1 above, containing 13% Santocel C had a 77° F. pen. of 91 while the same penetration could have been obtained by adding 6.8% by weight asphaltenes.

EXAMPLE 2

The penetration of two samples of the same pipe still bottoms was adjusted to the same value, in one case by the addition of 14.4% by weight Santocel C and in the other case by oxidation. The properties of the two samples are compared in Table II below:

Table II

COMPARISON OF PROPERTIES OF OXIDIZED ASPHALT WITH ONE CONTAINING SANTOCEL C FROM SAME PSB

|  | Pipe Still Bottoms+ 14.4% Santocel C | Oxidized Pipe Still Bottoms |
|---|---|---|
| Pen.: | | |
| 77° F | 72 | 72 |
| 100° F | | 270 |
| 32° F | 23 | 24 |
| R. & B. Soft. Pt. °F | 160 | 122 |
| Ductility: | | |
| 77° —5 cm./min | 12 | 100+ |
| 60° —5 cm./min | 17 | 100+ |
| Pen. 77°/pen. 32° | 3.13 | 3.00 |

It will be observed that the composition containing Santocel has approximately the same penetration values but a much higher softening point which is indicative of the composition's improved resistance to flow.

EXAMPLE 3

Pipe still bottoms were oxidized to a penetration of 135 at 77° F. Portions of the asphalt so prepared were heated to 300° F. and blended with other materials using a high speed mixer. Subsequent to blending, the samples were kept hot for some time to permit the escape of dispersed air. The data are tabulated below in Table III.

Table III

| Sample | Composition | Penetration °F. 100° | Penetration °F. 77° | Penetration °F. 32° | R. and B. Soft. Pt. °F. | Soft. Pt.-Pen. Index ×10 |
|---|---|---|---|---|---|---|
| 1 | Blank | 400+ | 135 | 30 | 103 | 2.97 |
| 2 | 85% asphalt / 15% alumina (325 mesh) | 318 | 103 | 24 | 116 | 2.54 |
| 3 | 85% asphalt / 15% Youngstown clay | 357 | 114 | 27 | 110 | 2.56 |
| 4 | 90% asphalt / 10% Santocel ARD | 338 | 115 | 27 | 116 | 2.16 |

The low figure of softening point-penetration index obtained for the sample containing Santocel ARD indicates that it has improved temperature susceptibility over both the blank and the other compositions tested.

It is believed that the improvement obtained from the use of silica aerogel is a result of the gel-forming ability of a silica which is not possessed by the other materials tested. In addition to the advantage of low temperature susceptibility, the compositions of the invention also possess thixotropic properties.

It will be obvious to those skilled in the art that many modifications may be made within the scope of the present invention without departing from the spirit thereof, and the invention is to be restricted only in accordance with the appended claims.

We claim:

1. An asphalt composition consisting essentially of a mixture of an asphalt base and about 1 to 20% by weight of an aerogel.

2. An asphalt composition consisting essentially of a mixture of a pipe still bottoms and about 1 to 20% by weight of an aerogel.

3. An asphalt composition consisting essentially of a mixture of partially oxidized pipe still bottoms and about 1 to 20% by weight of a silica aerogel.

4. An asphalt composition consisting essentially of a mixture of pipe still bottoms and about 1 to 20% by weight of a silica aerogel.

5. An asphalt composition consisting essentially of a mixture of partially oxidized pipe still bottoms having a penetration value at 77° F. in excess of 100 and an amount of an aerogel within the range of 1 to 20% to reduce the penetration value to within the range of 70–80 at 77° F.

References Cited in the file of this patent

UNITED STATES PATENTS

| | | |
|---|---|---|
| 1,429,338 | Glass | Sept. 19, 1922 |
| 1,943,532 | Howe | Jan. 16, 1934 |
| 2,045,906 | Gardner et al. | June 30, 1936 |
| 2,065,881 | Alvarado | Dec. 29, 1936 |
| 2,188,007 | Kistler | Jan. 23, 1940 |

OTHER REFERENCES

Industrial and Engineering Chemistry, vol. 33 of 1941, pages 1169–1173.